United States Patent
Militaru

(10) Patent No.: US 6,658,187 B2
(45) Date of Patent: Dec. 2, 2003

(54) OPTICAL FIBER CABLE ASSEMBLY WITH INTERSTITIAL SUPPORT MEMBERS

(75) Inventor: Cristian I. Militaru, Duncan, SC (US)

(73) Assignee: Alcoa Fujikura Limited, Franklin, TN (US)

( * ) Notice: Subject to any disclaimer, the term of this patent is extended or adjusted under 35 U.S.C. 154(b) by 0 days.

(21) Appl. No.: 10/159,642

(22) Filed: Jun. 3, 2002

(65) Prior Publication Data

US 2003/0059183 A1 Mar. 27, 2003

Related U.S. Application Data

(63) Continuation-in-part of application No. 10/093,212, filed on Mar. 7, 2002, which is a continuation-in-part of application No. 10/052,807, filed on Jan. 23, 2002.
(60) Provisional application No. 60/264,549, filed on Jan. 26, 2001.

(51) Int. Cl.[7] .................................................. G02B 6/44
(52) U.S. Cl. ...................................... 385/112; 385/113
(58) Field of Search ............................. 385/100, 103, 385/109–114

(56) References Cited

U.S. PATENT DOCUMENTS 6,249,629 B1 * 6/2001 Bringuier ................ 385/113
6,292,611 B1 * 9/2001 Chamberlain et al. ...... 385/114
6,577,796 B2 * 6/2003 Anelli et al. ................ 385/112

FOREIGN PATENT DOCUMENTS

| FR | 2718564 | 6/1994 | ........... H01B/11/22 |
| GB | 2064163 | 11/1980 | ............ G02B/5/14 |

* cited by examiner

Primary Examiner—Khiem Nguyen
(74) Attorney, Agent, or Firm—Randy A. Notzen; Tracey D. Beiriger

(57) ABSTRACT

Fiber optic conduits are received around a central axis with their axes extending in the same direction as the central axis and with each fiber optic conduit tangent to two other fiber optic conduits. The fiber optic conduits define a central interstitial space therebetween and a plurality of outer interstitial spaces between each pair of fiber optic conduits on a side thereof opposite the central interstitial space. A central interstitial member is received in the central interstitial space tangent to the fiber optic conduits and an outer interstitial member is received in each outer interstitial space tangent to the pair of fiber optic conduits defining the outer interstitial space. The central interstitial member has a larger modulus of elasticity than each outer interstitial member.

23 Claims, 4 Drawing Sheets

OPTICAL FIBER CABLE ASSEMBLY WITH INTERSTITIAL SUPPORT MEMBERS

CROSS REFERENCE TO RELATED APPLICATIONS

This application is a continuation-in-part of U.S. patent application Ser. No. 10/093,212, filed Mar. 7, 2002, which is a continuation-in-part of U.S. patent application Ser. No. 10/052,807, filed Jan. 23, 2002, which claims the benefit of U.S. Provisional Patent Application Ser. No. 60/264,549, filed Jan. 26, 2001.

BACKGROUND OF THE INVENTION

1. Field of the Invention

The present invention relates to optical fiber cables and, more particularly, to an improved geometrical arrangement and selection of elements forming an optical fiber cable that decreases the diameter, linear weight and cost of the optical fiber cable while, at the same time, improving its mechanical performance.

2. Description of Related Art

One type of prior art optical fiber cable assembly includes an optical core surrounded by one or more jackets. The optical core includes a plurality, e.g., six, buffer tubes surrounding a central member. Each buffer tube has a wall that encloses a plurality of optical fibers. The wall of each buffer tube is preferably formed from a synthetic thermoplastic compound, such as polybutylene-terephthalate (PBT), or polyester, such as nylon, or polyolefin, such as polyethylene. The central member is formed from a fiber reinforced plastic (FRP) rod formed from silica fibers encased in plastic coating.

The FRP rod forming the central member has a silica content between 70% and 85% and a plastic content between 30% and 15%. Because of the percentage of silica, the FRP rod is relatively rigid and has a relatively high modulus of elasticity, e.g., 50,300 N/mm$^2$±10%.

As discussed above, the optical core is surrounded by a plurality of jackets. In an embodiment designed for aerial installations, the optical core is surrounded by an inner jacket formed from polyolefin, such as polyethylene, or polyester, such as nylon, an intermediate, strength layer formed from an Aramid yarn or other strength member, such as fiber glass, and an outer jacket, also formed from polyolefin such as polyethylene, or polyester, such as nylon. The optical fiber cable assembly may also include a Mylar tape and/or polyester binder disposed between the optical core and/or the inner jacket and between the strength layer and the outer jacket. In addition, polyester rip cords can be included between the inner jacket and the Mylar tape adjacent the optical core and/or between the outer jacket and the Mylar tape adjacent the strength layer.

Optical fiber cable assemblies designed for duct or premise applications are substantially the same as those designed for aerial installations except that the outer jacket and strength layer can be omitted whereupon the inner jacket becomes the outer jacket.

Problems with the prior art design of optical fiber cable assemblies include the inability to reduce the diameter of the optical core or reduce the number of Aramid yarns forming the strength layer surrounding the optical core while maintaining an acceptable degree of mechanical loading capacity of the cable assembly. Because of these inabilities, no reductions are available in the overall diameter of the optical fiber cable assembly, the circumferences and, hence, weights of the inner and outer jackets, the overall linear weight of the cable assembly or the overall cost of the cable assembly.

It is, therefore, an object of the present invention to overcome the above problems and others by providing an improved optical fiber cable assembly having an improved geometric design with improved mechanical performance over prior art fiber optic cable assemblies. This improved geometric design enables the same number of optical fibers to be received in an optical fiber cable assembly having a smaller diameter than prior art optical fiber cable assemblies while maintaining an acceptable degree of mechanical loading capacity, e.g., self loading and weather related mechanical loading, commensurate with its smaller outside diameter and lower linear weight Still other objects will become apparent to those of ordinary skill in the art upon reading and understanding the following detailed description.

SUMMARY OF THE INVENTION

Accordingly, I have invented an optical fiber cable assembly that includes an optical core having a plurality of elongated, hollow buffer tubes, a plurality of elongated outer interstitial members and an elongated central interstitial member. The plurality of buffer tubes is arranged with their axes extending in the same direction. When viewed from an end of the optical fiber cable assembly, the axis of each buffer tube is positioned at a corner of an imaginary triangle or an imaginary square. The plurality of buffer tubes is arranged with each buffer tube tangent to two other buffer tubes whereupon each pair of adjacent buffer tubes define an outer interstitial space therebetween. Each outer interstitial member is received in one of the outer interstitial spaces tangent to the two buffer tubes defining the outer interstitial space. The axis of each outer interstitial member extends in the same direction as the axes of the buffer tubes. The central interstitial member is received in a central interstitial space formed between the plurality of buffer tubes. The central interstitial member is positioned tangent to the plurality of buffer tubes with an axis of the central interstitial member extending in the same direction as the axes of the buffer tubes. The central interstitial member and the outer interstitial members have different moduli of elasticity, with the central interstitial member having a larger modulus of elasticity than the modulus of elasticity of each outer interstitial member.

In one exemplary embodiment of an optical fiber cable assembly, the central interstitial member is a fiber reinforced plastic (FRP) rod having silica fibers encased in a plastic coating, with a silica content between 70% and 85% by volume. It has been observed that FRPs having a higher percentage of silica fibers have a greater modulus of elasticity. In this exemplary embodiment, the FRP rod used as the central interstitial member has a modulus of elasticity of 50,300 N/mm$^2$±10%. Moreover, in this exemplary embodiment, each outer interstitial member is also a FRP rod having silica fibers encased in a plastic coating, with a silica content between 50% and 70% by volume and with a modulus of elasticity of 37,700 N/mm$^2$±10%.

The lower modulus of elasticity of the outer interstitial members make them less rigid than the central interstitial member and enables them to be spiral wound around the central interstitial member, together with the buffer tubes. The central interstitial member having a higher modulus of elasticity is not easily spiral wound. In an exemplary embodiment, the outer interstitial members and buffer tubes are wound spirally at a winding pitch between 8 and 20 times a diameter of the optical core. For aerial applications, the outer interstitial members and buffer tubes are preferably wound spirally at a winding pitch between 8 and 16 times the diameter of the optical core. For duct or premise applications, the outer interstitial members and buffer tubes are preferably wound spirally at a winding pitch between 10 and 20 times the diameter of the optical core.

The optical fiber cable assembly can also include a Mylar tape and/or a polyester binder disposed helically around the optical core tangent to the buffer tubes and outer interstitial members. An elongated polyester rip cord can be disposed on a side of the Mylar tape and/or polyester binder opposite the optical core. The longitudinal axis of the rip cord extends in the same direction, e.g. parallel, as the axes of the buffer tubes.

For optical fiber cable assemblies designed for duct or premise applications, a jacket comprised of, for example, polyolefin such as polyethylene, or polyester, such as nylon, surrounds the optical core. For optical fiber cable assemblies designed for aerial applications, an inner jacket comprised of, for example, a polyolefin, such as polyethylene, or polyester, such as nylon, surrounds the optical core, a strength layer comprised of, for example, Aramid or fiber glass yarn surrounds the inner jacket and a outer jacket comprised of, for example, a polyolefin, such as polyethylene, or polyester, such as nylon, surrounds the strength layer. In this latter assembly, a Mylar tape and/or a polyester binder can be disposed between the strength layer and the outer jacket. An elongated polyester rip cord can also be disposed between the outer jacket and the Mylar tape and/or polyester binder disposed adjacent the strength layer.

I have also invented an optical fiber cable assembly that includes a plurality of fiber optic conduits received around a longitudinally extending central axis with a longitudinal axis of each fiber optic conduit extending in the same direction as the central axis and with each fiber optic conduit tangent to two other fiber optic conduits. The plurality of fiber optic conduits define a central interstitial space therebetween and define a plurality of outer interstitial spaces between each pair of fiber optic conduits on a side thereof opposite the central interstitial space. A plurality of elongated outer interstitial members is received around the central axis with their longitudinal axes extending in the same direction as the central axis. Each outer interstitial space receives one of the outer interstitial members tangent to the pair of optical fiber conduits defining the outer interstitial space. A central interstitial member is received in the central interstitial space tangent to the fiber optic conduits and with an axis of the central interstitial member coaxial with the central axis. The central interstitial member has a larger modulus of elasticity than each outer interstitial member.

The outer interstitial members and the fiber optic conduits can be wound spirally around the central interstitial member. When viewed from an end of the optical fiber cable assembly, the longitudinal axis of each fiber optic conduit is positioned at a corner of an imaginary triangle or an imaginary square.

The optical fiber cable assembly includes a first jacket surrounding the buffer tubes and outer interstitial members. The optical fiber cable assembly can also include a second jacket surrounding the first jacket. Mylar tape and/or polyester binder can be disposed (i) inside the inner jacket around the buffer tubes and outer interstitial members and/or (ii) between the first and second jackets. An elongated polyester rip cord can be disposed between the (i) first jacket and the Mylar tape and/or polyester binder adjacent the buffer tubes and outer interstitial members and/or (ii) between the first and second jackets. The rip cord has a longitudinal axis that extends in the same direction as the axis of the optical fiber tubes.

The first and second jackets are protective covers. The optical fiber cable assembly can further include a strength layer, preferably formed from Aramid or fiber glass yarn, disposed between the first and second outer jackets.

DETAILED DESCRIPTION OF THE INVENTION

The present invention will be described with reference to the accompanying like reference numbers correspond to like elements.

Figure 1:
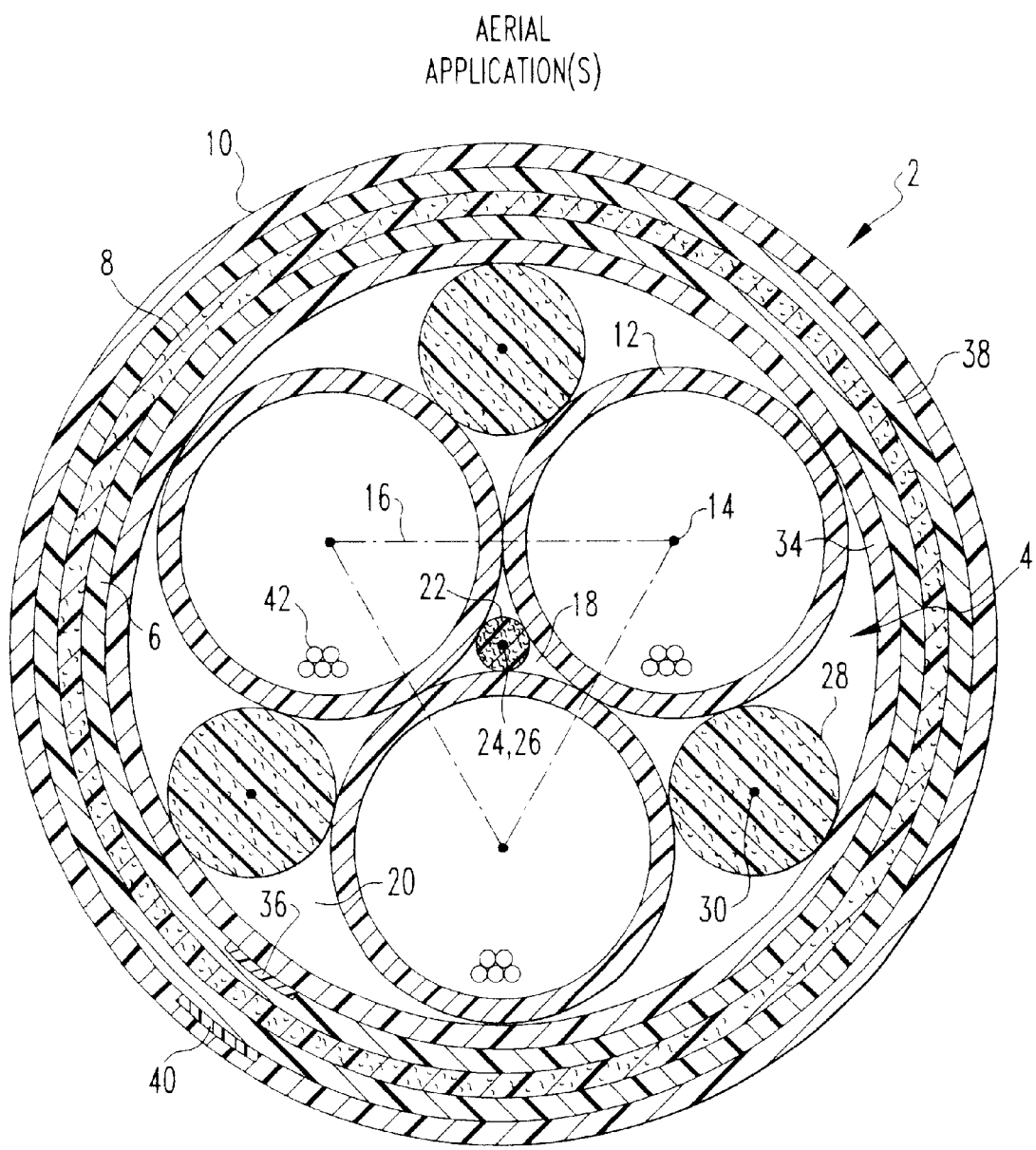
FIGS. 1–4 are end views of optical fiber cable assemblies in accordance with various embodiments of the present invention.

With reference to FIG. 1, a first embodiment optical fiber cable assembly 2 designed for aerial applications includes an optical core 4 surrounded by an inner jacket 6, a strength layer 8 and an outer jacket 10. Optical core 4 includes three hollow, elongated and cylindrical buffer tubes 12 arranged with their axes 14 extending in the same direction. When viewed from an end of optical core 4, the axis of each buffer tube 12 is positioned at a corner of an imaginary triangle 16 with the outside diameter of each buffer tube 12 tangent to the two other buffer tubes 12.

Buffer tubes 12 define therebetween a first, central interstitial space 18 and a plurality of second, outer interstitial spaces 20. More specifically, each pair of adjacent buffer tubes 12 define therebetween on a side thereof opposite first, central interstitial space 18 one of the second, outer interstitial spaces 20.

A central, elongated outer interstitial member 22 is received in first, central interstitial space 18 tangent to buffer tubes 12. Central interstitial member 22 has an axis 24 positioned substantially coaxial with a central axis 26 of optical fiber cable assembly 2. An outer interstitial member 28 is received in each second, outer interstitial space 20 tangent to the buffer tubes 12 defining the second, outer interstitial space 20. Each outer interstitial member 28 has an axis 30 that extends in the same direction as axes 14 of buffer tubes 12.

Central interstitial member 22 is a rigid, fiber reinforced plastic (FRP) rod having silica fibers encased in a plastic coating. An exemplary FRP rod used as a central interstitial member 22 has a silica fiber content between 70% and 85% by volume and a plastic content between 30% and 15% by volume. It has been observed that FRP rods having a higher silica fiber content have a greater rigidity and, hence, a greater modulus of elasticity. An exemplary FRP rod used as a central interstitial member 22 has a modulus of elasticity of 50,300 N/mm$^2$±10%.

Each outer interstitial member 28 is also an FRP rod. However, since, during assembly of optical fiber cable assembly 2, outer interstitial members 28 and buffer tubes 12 are wound spirally around central interstitial member 22, each outer interstitial member 28 is less rigid than central interstitial member 22. In other words, each outer interstitial member 28 is semi-rigid.

In order for each outer interstitial member 28 to be less rigid than central interstitial ember 22, the FRP rod forming each outer interstitial member 28 has a lower silica fiber content than central interstitial member 22. An exemplary FRP rod used as an outer interstitial member 28 has a silica fiber content between 50% and 70%, a plastic content between 50% and 30% and a modulus of elasticity of 37,700 N/mm$^2$±10%.

It is to be appreciated, that the foregoing percentages of silica fiber and plastic content and moduli of elasticity for central interstitial member 22 and outer interstitial members 28 are only for the purpose of illustration and are not to be construed as limiting the invention.

As discussed above, outer interstitial members 28 and buffer tubes 12 are would spirally around central interstitial member 22. An exemplary optical fiber cable assembly 2 has its outer interstitial members 22 and buffer tubes 12 wound spirally at a winding pitch between 8 and 20 times the diameter of optical core 4. For aerial applications, outer interstitial members 28 and buffer tubes 12 are wound spirally at a winding pitch between 8 and 16 times the diameter of optical core 4. For duct applications, outer interstitial members 28 and buffer tubes 12 are wound spirally at a winding pitch between 10 and 20 times the inside diameter of optical core 4.

A layer 34 of Mylar tape and/or polyester binder can be disposed, e.g., helically wound, around buffer tubes 12 and outer interstitial members 28 inside inner jacket 6. An elongated rip cord 36, preferably formed of a polyester, can be disposed between inner jacket 6 and layer 34. Another layer 38 of Mylar tape and/or polyester binder can also be disposed between strength layer 8 and outer jacket 10. An elongated rip cord 40, also preferably formed of polyester, can be disposed between layer 38 and outer jacket 10. The polyester binder which can be utilized to form layer 34 and/or layer 38 is preferably configured to block the passage of moisture, e.g., water, therethrough and into optical core 4.

Rip cords 36 and 40 have their longitudinal axes extending in the same direction as the longitudinal axes of buffer tubes 12. When pulled radially away from central interstitial member 22, rip cord 40 tears outer jacket 10 longitudinally. This tearing enables select portions of outer jacket 10 to be removed by the subsequent trimming thereof without damaging strength layer 8 or inner jacket 6. Similarly, when pulled radially away from central interstitial member 22, rip cord 36 tears inner jacket 6 longitudinally whereupon inner jacket 6 can be removed by selective trimming thereof without damaging layer 34.

Each buffer tube 12 is formed from a synthetic thermoplastic compound, such as polybutylene-terephthalate (PBT), or polyester, such as nylon, or polyolefin, such as polyethylene. In an exemplary optical fiber cable assembly, each buffer tube 12 has an inside diameter of 2.7 mm and an outside diameter of 3.55 mm. The 2.7 mm inside diameter enables each buffer tube 12 to receive up to twenty-four optical fibers 42. Inner jacket 6 and outer jacket 10 are formed from polyolefin, such as polyethylene, or polyester, such as nylon.

Strength layer 8 is formed from a strength material, such as woven Aramid or fiber glass yarn. In an exemplary embodiment, strength layer 8 is formed from 70 to 120 ends of Aramid yarn, with each end of Aramid yarn having between 1,000 and 4,000 Aramid filaments, a breaking strength between 290 and 1,800 N and a modulus of elasticity of 100,000 N/mm$^2$+20% or −10%.

In the exemplary optical fiber cable assembly where each buffer tube 12 has an inside diameter of 2.7 mm and an outside diameter of 3.55 mm, central interstitial member 22 has a diameter of 0.55 mm, each outer interstitial member 28 has a diameter of 1.71 mm, inner jacket 6 has a thickness between 0.25 and 1.4 mm and outer jacket 10 has a thickness between 0.4 and 1.8 mm.

It is to be appreciated that the above described materials and dimensions of the various elements of the exemplary optical fiber cable assembly are for the purpose of illustration and are not to be construed as limiting the invention.

Figure 2:
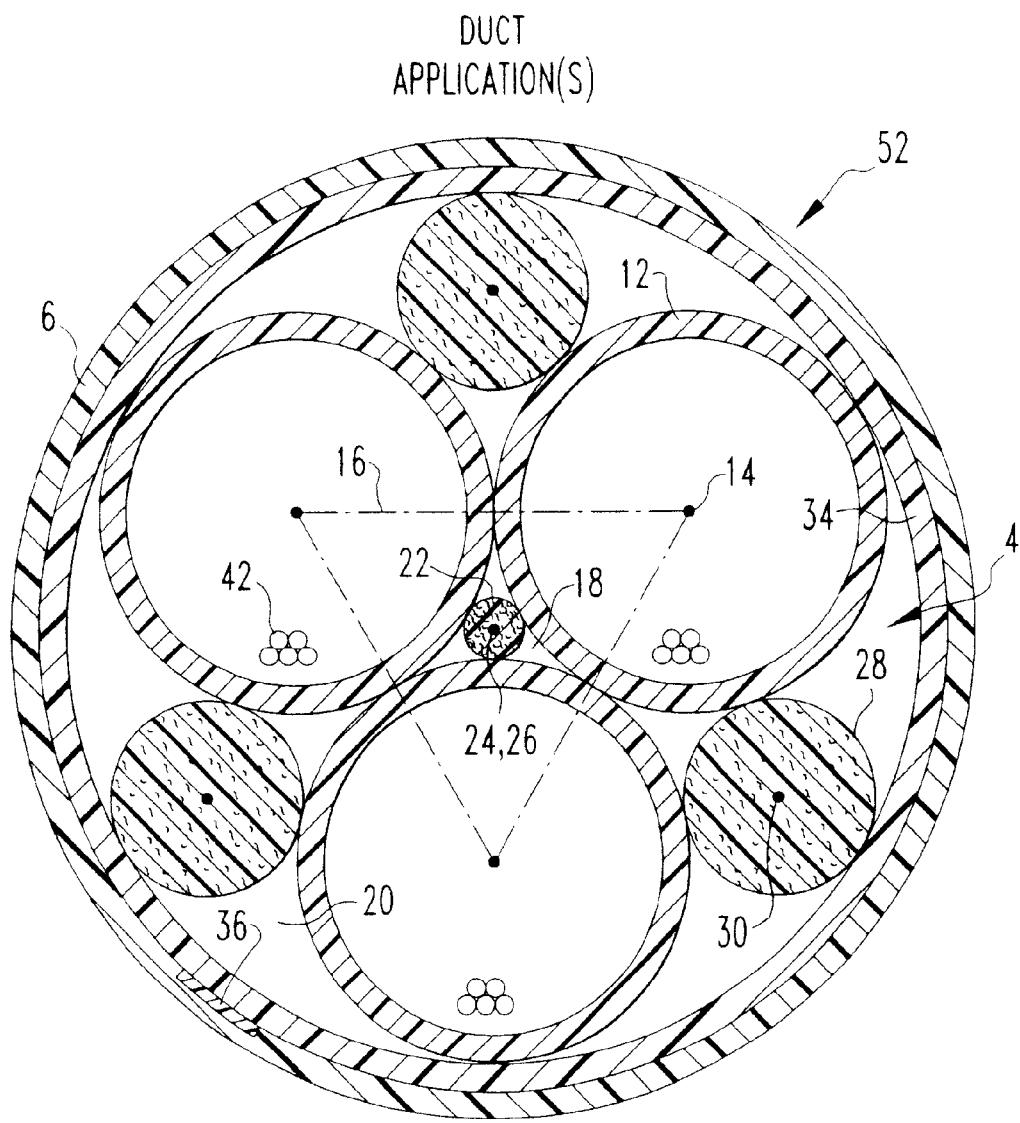

With reference to FIG. 2 and with continuing reference to FIG. 1, a second embodiment optical fiber cable assembly 52 designed for application in ducts, premises, conduits, raceways, and the like (hereinafter "duct applications"), has the same configuration of optical core 4 as optical fiber cable assembly 2. However, since optical fiber cable assembly 52 is designed for duct applications, outer jacket 10, layer 38 and strength layer 8 in optical fiber cable assembly 2 can be omitted in optical fiber cable assembly 52 whereupon inner jacket 6 becomes the outer jacket. Other than these omissions, optical fiber cable assembly 52 can be the same as optical fiber cable assembly 2.

Figure 3:
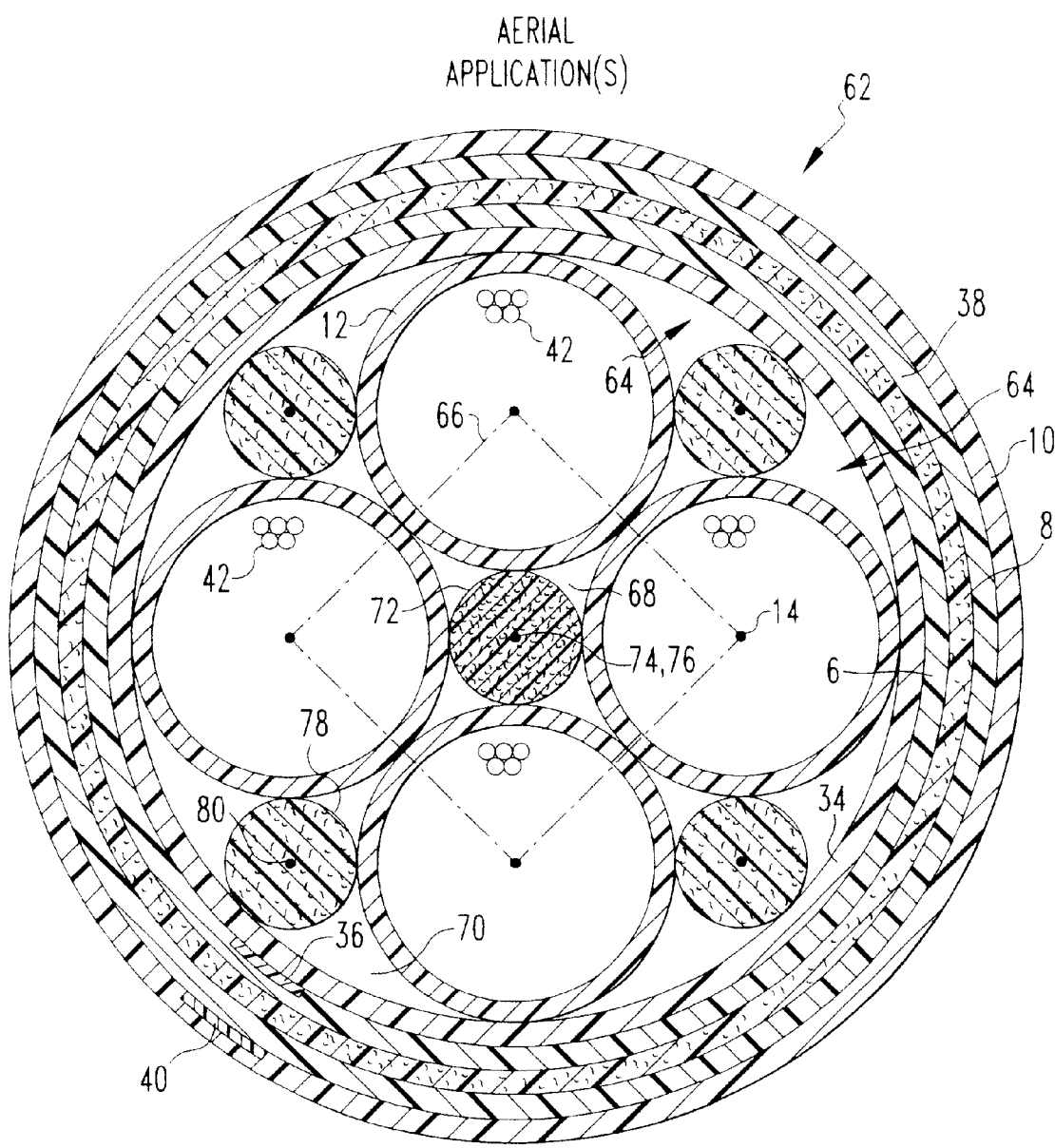

With reference to FIG. 3, and with continuing reference to FIG. 1, a third embodiment optical fiber cable assembly 62 has an optical core 64 that is surrounded by inner jacket 6, strength layer 8, outer jacket 10 and layers 34 and 38 of Mylar tape and/or polyester binder in the manner described above in connection with optical fiber cable assembly 2. Optical core 64, however, has four buffer tubes 12 arranged with their axes extending in the same direction. When viewed from an end of optical core 64, the axis 14 of each buffer tube 12 is positioned at a corner of an imaginary square 66, with the outside diameter of each buffer tube 12 tangent to two other buffer tubes 12.

In optical core 64, buffer tubes 12 define therebetween a first, central interstitial space 68 and a plurality of second, outer interstitial spaces 70. More specifically, in optical core 64, each pair of adjacent buffer tubes 12 define therebetween on a side thereof opposite first, central interstitial space 68 one of the second, outer interstitial spaces 70, A central, elongated outer interstitial member 72 is received in first, central interstitial space 68 tangent to buffer tubes 12 and with an axis 74 of central interstitial member 72 positioned substantially coaxial with a central axis 76 of optical fiber cable assembly 62. An outer interstitial member 78 is received in each second outer interstitial space 70 tangent to the pair of buffer tubes 12 define the second, outer interstitial space 70. Each outer interstitial member 78 has an axis 80 that extends in the same direction as the axes 14 of buffer tubes 12.

Like central interstitial member 22, central interstitial member 72 is a rigid FRP rod having a relatively high modulus of elasticity, e.g., 50,300 N/mm$^2$±10%. In order to realize this rigidity and relatively high modulus of elasticity, central interstitial member 72 has a silica fiber content between 70% and 85% by volume and a plastic content between 30% and 15% by volume.

Similarly, like outer interstitial members 28, each outer interstitial member 78 is a semi-rigid FRP rod having a lower modulus of elasticity, e.g., 37,700 N/mm$^2$±10%, than the modulus of elasticity of central interstitial member 72. In order to realize this lower rigidity and modulus of elasticity, each outer interstitial member 78 has a lower silica fiber content than central interstitial member 72. An exemplary fiber reinforced plastic rod used as an outer interstitial member 78 has a silica fiber content between 50% and 70% by volume and a plastic content between 50% and 30% by volume.

It is to be appreciated that the foregoing percentages of silica fiber and plastic content and moduli of elasticity for central interstitial member 72 and outer interstitial members 78 are for the purpose of illustration and are not to be construed as limiting the invention.

During assembly of optical fiber cable assembly 62, outer interstitial members 78 and buffer tubes 12 are wound spirally around central interstitial member 72 at a winding pitch between 8 and 20 times the diameter of optical core 64. For aerial applications, the winding pitch is between 8 and 16 times the diameter of optical core 64. For duct applications, the winding pitch is between 10 and 20 times the diameter of an optical core 64.

In an exemplary optical fiber cable assembly 62, each buffer tube 12 has an inside diameter of 2.7 mm and an outside diameter of 3.55 mm. This inside diameter enables each buffer tube 12 to receive up to twenty-four optical fibers 42. In this exemplary optical fiber cable assembly 62, central interstitial members 72 and each outer interstitial member 78 have a diameter of 1.5 mm. Since jackets 6 and 10, strength layer 8, layers 34 and 38, and rip cords 36 and 40 are the same as described above in connection with FIG. 1, no description of their construction or physical dimensions will be in connection with FIG. 3 to avoid redundancy.

It is to be appreciated that the above described materials and dimensions of optical fiber cable assembly 62 are for the purpose of illustration and are not to be construed as limiting the invention.

Figure 4:
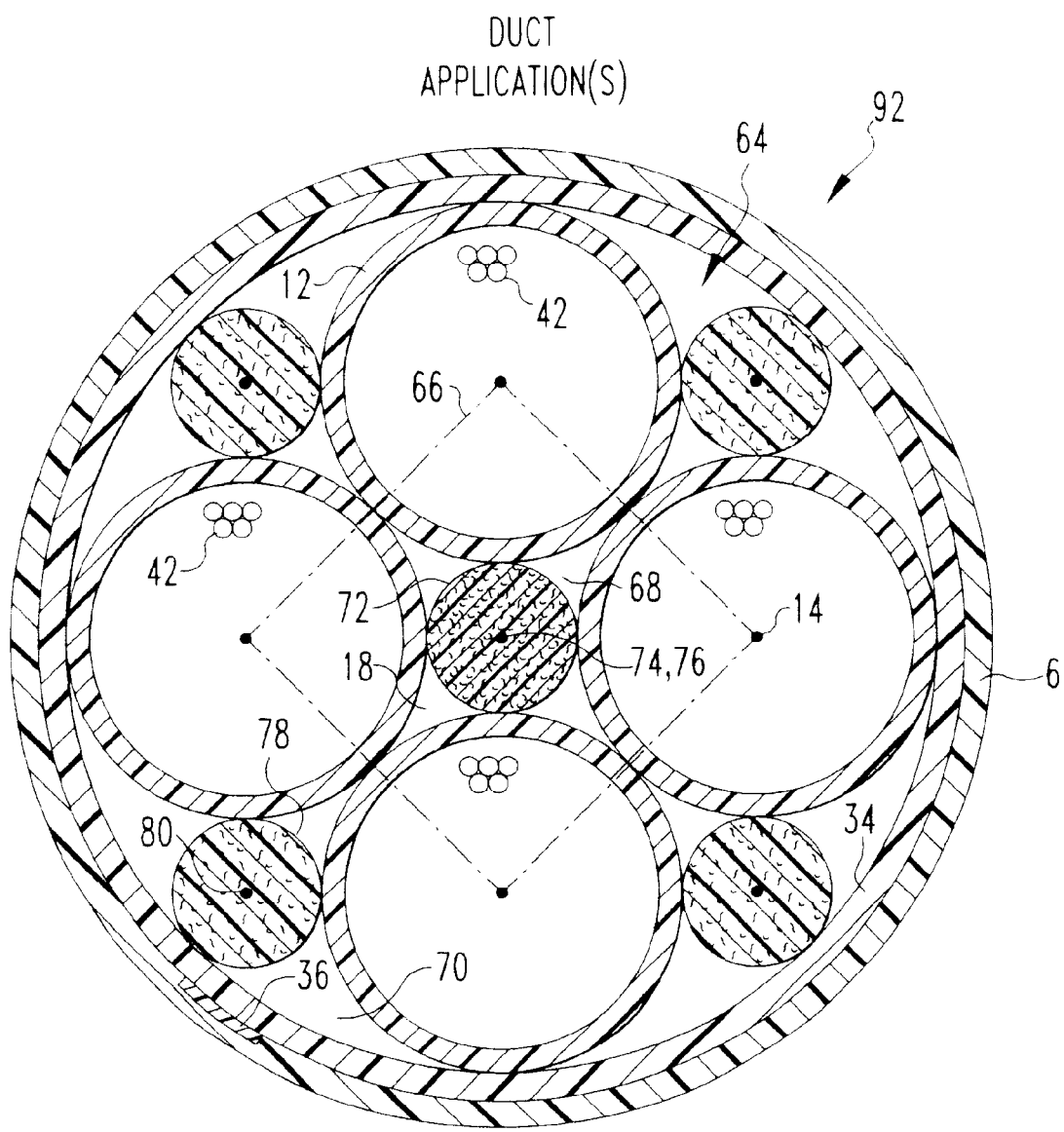

With reference to FIG. 4, and with continuing reference to FIG. 3, a fourth embodiment optical fiber cable assembly 92 is substantially the same as optical fiber cable assembly 62. However, since optical fiber cable assembly 92 is designed for duct applications, outer jacket 10, layer 38 and strength layer 8 in optical fiber cable assembly 62 can be omitted in optical fiber cable assembly 92 whereupon inner jacket 6 becomes the outer jacket. Other than these omissions, optical fiber cable assembly 92 can be the same as optical fiber cable assembly 62.

The various embodiments of the present invention enable the same number of optical fibers to be received in a smaller diameter cable assembly than the prior art optical fiber cable assemblies while maintaining an acceptable degree of mechanical loading capacity commensurate with its smaller outside diameter and lower linear weight. More specifically, when compared to prior art optical fiber cable assemblies, the present invention enables a reduction of 2 to 2½ times the diameter of the central interstitial member, a reduction of 12% to 15% of the diameter of the optical core, a reduction of 5% to 10% in the circumferences, thicknesses and weights of the various jackets, a reduction of 3 to 8 Aramid or fiber glass yarn ends and a reduction of 10% to 15% of the overall cost of the cable assembly, while at the same time, increasing the tensile strength and modulus of elasticity of the overall cable assembly. Because of these advantages, especially the reduction in the overall linear weight of the cable assembly, smaller, lighter and less expensive mounting hardware can be utilized to install the optical fiber cable assemblies of the present invention.

The invention has been described with reference to the preferred embodiments. Obvious modifications and alterations will occur to others upon reading and understanding the preceding detailed description. For example, for duct applications, central interstitial member can be formed from a bundle of Aramid or fiber glass yarn ends either alone or encased in a plastic coating. It is intended that the invention be construed as including all such modifications and alterations insofar as they come within the scope of the appended claims or the equivalents thereof.

The invention claimed is:

1. An optical fiber cable assembly comprising:
    an optical core including a plurality of elongated, hollow buffer tubes, a plurality of elongated outer interstitial members and an elongated central interstitial member;
    the plurality of buffer tubes arranged with their axes extending in the same direction with each buffer tube tangent to two other buffer tubes and with each pair of adjacent buffer tubes defining an outer interstitial space therebetween, the axis of each buffer tube positioned at a corner of one of (i) an imaginary triangle and (ii) an imaginary square;
    each outer interstitial member received in one of the outer interstitial spaces tangent to the two buffer tubes defining the outer interstitial space with an axis of each outer interstitial member extending in the same direction as the axes of the buffer tubes; and
    the central interstitial member received in a central interstitial space formed between the plurality of buffer tubes, the central interstitial member positioned tangent to the plurality of buffer tubes with an axis of the central interstitial member extending in the same direction as the axes of the buffer tubes, wherein the central interstitial member and the outer interstitial members have different moduli of elasticity.

2. The optical fiber cable assembly as set forth in claim 1, wherein the central interstitial member has a modulus of elasticity that is larger than a modulus of elasticity of each outer interstitial member.

3. The optical fiber cable assembly as set forth in claim 2, wherein the central interstitial member has a modulus of elasticity of 50,300 N/mm$^2$±10%.

4. The optical fiber cable assembly as set forth in claim 3, wherein the central interstitial member is a fiber reinforced plastic rod having a silica fiber content between 70% and 85% by volume.

5. The optical fiber cable assembly as set forth in claim 2, wherein each outer interstitial member has a modulus of elasticity of 37,700 N/mm$^2$±10%.

6. The optical fiber cable assembly as set forth in claim 5, wherein each outer interstitial member is a fiber reinforced plastic rod having a silica fiber content between 50% and 70%.

7. The optical fiber cable assembly as set forth in claim 2, wherein the outer interstitial members and buffer tubes are wound spirally around the central interstitial member.

8. The optical fiber cable assembly as set forth in claim 7, wherein the outer interstitial members and buffer tubes are wound spirally at a winding pitch between 8 and 20 times a diameter of the optical core.

9. The optical fiber cable assembly as set forth in claim 8, wherein the outer interstitial members and buffer tubes are wound spirally at a winding pitch between 8 and 16 times the diameter of the optical core for aerial applications and between 10 and 20 times the diameter of the optical core for duct applications.

10. The optical fiber cable assembly as set forth in claim 1, further including at least one of (i) a Mylar tape and (ii) a polyester binder disposed around the optical core tangent to the buffer tubes and outer interstitial members.

11. The optical fiber cable assembly as set forth in claim 10, further including an elongated rip cord disposed on a side of the Mylar tape and/or polyester binder opposite the optical core, the rip cord having a longitudinal axis extending in the same direction as the axes of the buffer tubes.

12. The optical fiber cable assembly as set forth in claim 10, further including a jacket comprised of polyolefin or polyester surrounding the Mylar tape and/or polyester binder.

13. The optical fiber cable assembly as set forth in claim 1, further including:
   an inner jacket comprised of polyolefin or polyester surrounding the optical core;
   a strength layer comprised of Aramid or fiber glass yarn surrounding the first jacket; and
   an outer jacket comprised of polyolefin or polyester surrounding the strength layer.

14. The optical fiber cable assembly as set forth in claim 13, further including at least one of (i) a Mylar tape and (ii) a polyester binder disposed between the strength layer and the outer jacket.

15. The optical fiber cable assembly as set forth in claim 14, further including an elongated rip cord disposed between the outer jacket and the Mylar tape and/or polyester binder, the rip cord having a longitudinal axis extending in the same direction as the axes of the buffer tubes.

16. An optical fiber cable assembly comprising:
   a plurality of elongated fiber optic conduits received around a longitudinally extending central axis with a longitudinal axis of each fiber optic conduit extending in the same direction as the central axis and with each fiber optic conduit tangent to two other fiber optic conduits, the plurality of fiber optic conduits defining a central interstitial space therebetween and defining a plurality of outer interstitial spaces between each pair of fiber optic conduits on a side thereof opposite the central interstitial space;
   a plurality of elongated outer interstitial members received around the central axis with their longitudinal axes extending in the same direction as the central axis, each outer interstitial space receiving one of the outer interstitial members tangent to the pair of fiber optic conduits defining the outer interstitial space; and
   a central interstitial member received in the central interstitial space tangent to the fiber optic conduits and with an axis of the central interstitial member coaxial with the central axis, wherein the central interstitial member has a larger modulus of elasticity than each outer interstitial member.

17. The optical fiber cable assembly as set forth in claim 16, wherein the outer interstitial members and the fiber optic conduits are wound spirally around the central interstitial member.

18. The optical fiber cable assembly as set forth in claim 16, wherein, when viewed from an end of the optical fiber cable assembly, the longitudinal axis of each fiber optic conduit is positioned at one corner of one of (i) an imaginary triangle and (ii) an imaginary square.

19. The optical fiber cable assembly as set forth in claim 16, further including at least one jacket surrounding the buffer tubes and outer interstitial members, wherein, when at least two jackets surround the buffer tubes and interstitial members, the at least two jackets are substantially coaxial.

20. The optical fiber cable assembly as set forth in claim 19, further including at least one of a Mylar tape and a polyester binder disposed at least one of (i) inside the at least one jacket and (ii) between the at least two jackets.

21. The optical fiber cable assembly as set forth in claim 20, further including an elongated rip cord disposed between at least one of (i) the at least one jacket and the at least one of the Mylar tape and the polyester binder surrounding the buffer tubes and outer interstitial members and (ii) between the at least two jackets, the rip cord having a longitudinal axis extending in the same direction as the axes of the buffer tubes.

22. The optical fiber cable assembly as set forth in claim 21, further including a strength layer disposed between the at least two jackets.

23. The optical fiber cable assembly as set forth in claim 22, wherein:
   the strength layer is an Aramid or fiber glass yarn; and
   each jacket is formed from polyolefin or polyester.

* * * * *